Figure 1:
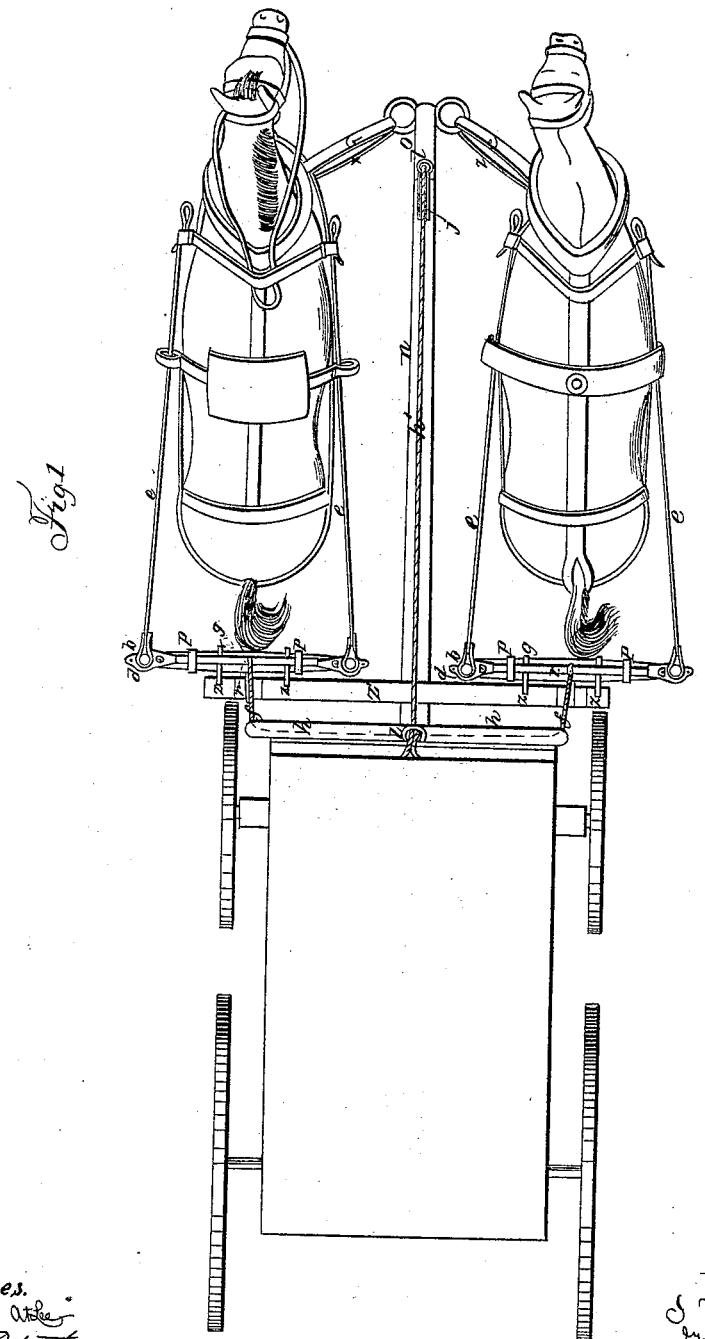

J. M. ROBERDS.
Whiffletree.

No. 29,313.

3 Sheets—Sheet 1.

Patented July 24. 1860.

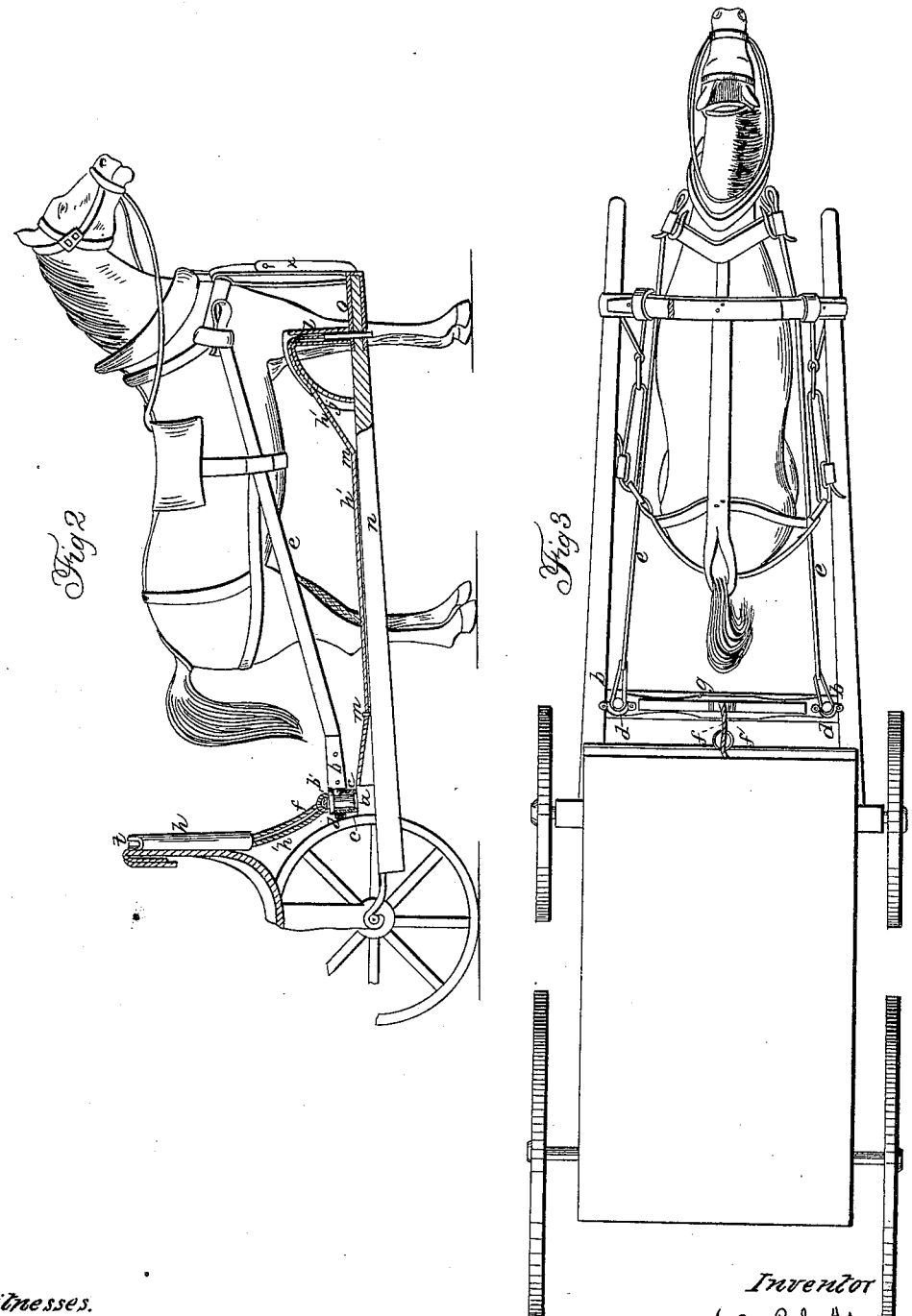

J. M. ROBERDS.
Whiffletree.
No. 29,313.
3 Sheets—Sheet 3.
Patented July 24, 1860
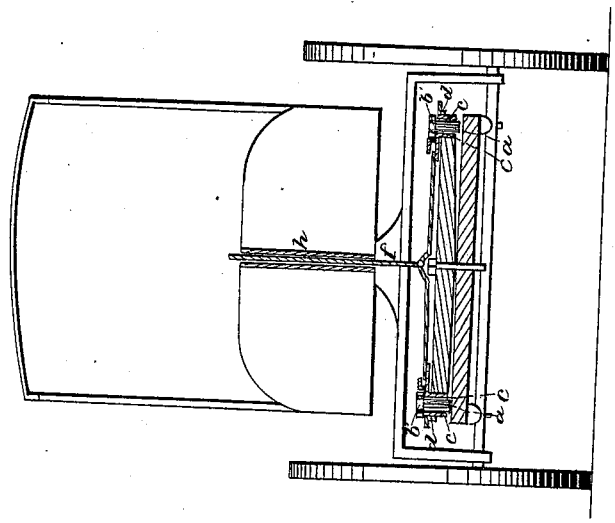
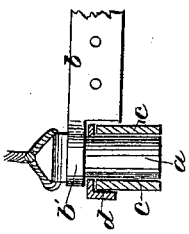

UNITED STATES PATENT OFFICE.

J. M. ROBERDS, OF PLAISANCE, LOUISIANA.

MODE OF DETACHING HORSES FROM VEHICLES.

Specification of Letters Patent No. 29,313, dated July 24, 1860.

*To all whom it may concern:*

Be it known that I, J. M. ROBERDS, of Plaisance, in the parish of Rapides and State of Louisiana, have invented a new and Improved Life-Preserver Attachment for Disengaging Horses from Vehicles; and I do hereby declare the following to be a full and exact description of the same, reference being had to the accompanying drawings, making part of this specification, in which—

Figure 1, represents a plan, and Fig. 2, a side view of my device for attaching horses to carriages. Fig. 3, is a plan, and Fig. 4, a front view and partial section of the same device, applied to a one horse carriage. Fig. 5, a detached view.

Similar letters of reference on each of the several figures indicate corresponding parts.

The nature of this invention consists, 1st, in the combination and relative arrangement of a swingle tree $g$, vertical cockeyes $c$, cockeye pins $a$, lifting bars $r$, cord $f$, and tube $h$, for the purpose of enabling the driver to detach the horse or horses, from the swingle tree, instantaneously, whenever it shall be desirable; 2nd, in the combination of a perforated tongue $n$, and perforated crab iron $o$, crane $j$, bolt $i$, cord $h'$, and tube $t$, with the swingle tree $g$, vertical cockeyes $c$, cockeye pin $b$, lifting caps or bars $r$, cord $f$, and tube $h$, for the purpose of detaching the horses simultaneously from the swingle tree and from the tongue.

The horses, harnessed as shown in the drawings, are attached to the carriage by the swingle tree straps $e$. Each of the trace straps terminates at its rear end into an iron cockeye pin $a$, the wings $b$, of which are riveted to the end of the strap.

A lifting cap or cross bar $r$, is arranged on top of each swingle tree. A vertical semicircular hole or cock eye is made in each end $d$, of the lifting bar, which corresponds with a hole through each end of the swingle tree, and with the diameter of the cockeye pin $a$. The lifting bar is provided with two stirrups $p$, or any equivalent device, for attaching the lifting bar to the swingle-tree in such a manner that it is free to move in a vertical direction.

Pins $z$, extend from the bar $z'$, of the swingle trees, across the swingle trees and under the cap, for the purpose of limiting the up and down play of the swingle trees.

A cord $f$, fastened to the lifting bar, passes through a tube $h$, up to the driver's seat. The tube serves to protect the cord from the horse's tail, and prevent its getting entangled with parts of the carriage or harness.

When the horse is to be attached to the carriage the lifting bar or cap is placed upon the swingle tree and the cockeye pins $a$, at the ends of straps or traces $e$, are inserted through the cockeyes, at the ends of the swingle tree, and through the holes in the ends of the lifting bar—as represented in the drawings.

It will be seen that on pulling the cord $f$, the lifting bar will be elevated, and, as the collars $b'$, of the cockeye pins $a$, rest upon the ends of the lifting cap or bar, the cockeye pins $a$, will be raised out of the cockeyes in the ends of the swingle-tree, thereby detaching the cockeye pins from the swingle tree. The cockeye pins are then at liberty to slip from the lifting bar, because the holes in the ends $d$ of the lifting bar, are semicircular so as to be open in front.

The above described device for attaching and detaching a horse to and from swingle trees, is the same whether applied to a single or double horse carriage, only that in the latter case the tube $h$, Fig. 4, has to be made in two branches to accommodate the two cords $f$ of both swingle trees as represented in Fig. 1.

In a double horse carriage—see Figs. 1, and 2,—each of the horses is attached to the rings of the crab iron $o$, at the forward end of the tongue $n$, by a strap $x$, in the usual manner. This crab iron $o$, which is in the shape of a ferrule, fitting loosely the forward end of the tongue, is provided with two small holes corresponding with a hole through the tongue, near its forward end. A pin $i$, being inserted through the holes of the crab iron and the hole in the tongue—as shown in Fig. 2—the crab iron is secured to the tongue.

The pin $i$, is incased and slides in a tube $l$, at the end of a crane $j$, fastened to the tongue somewhat in the rear of the crab iron. The upper surface of the crane is slightly concave for the accommodation of a cord $h'$, the forward end of which is secured to the upper end of the pin $i$, inside of said tube $l$. The cord $h'$ passes through the guide rings $m$, $m$,—projecting from the tongue—and through a tube $t$, in the center between the branch tubes $h$,—above described,—up to the driver's seat. On pulling this cord $h'$, the pin $i$, will be lifted out of the holes in the crab-iron and the holes in the tongue, so as to allow the crab iron to slip off the end of the tongue.

The ends of the cords $f$, and $h'$, being near the driver's seat the driver can at any time, when the horses should become unmanageable, pull the cords, whereupon the horses will be simultaneously detached from the swingle trees and from the tongue, so as to allow the horses to run off, and the carriage to remain at rest. The same thing can be accomplished with the single harness, for it will be observed that in the single harness, the breeching is fastened to a ring attached to the rigs, and therefore when the horse is detached from the swingle-tree of a single horse carriage, no obstruction to his passing out from between the shafts will be offered.

What I claim as my invention and desire to secure by Letters Patent is—

1. The combination and relative arrangement of a swingle tree $g$, vertical cockeyes $c$, cockeye pin $a$, lifting bars $r$, cord $f$, and tube $h$, substantially as and for, the purpose set forth.

2. The combination of a perforated tongue $n$, and perforated crab iron $o$, crane $j$, bolt $i$, cord $h'$ and tube $t$, with the swingle tree $g$, vertical cockeyes $c$, cock eye pin $b$, lifting caps or bars $r$, cord $f$, and tube $h$, substantially as and for, the purposes set forth.

J. M. ROBERDS.

Witnesses:
GOODWIN Y. ATLEE,
G. F. G. DIETERICH.